Aug. 20, 1946.  E. H. LAND  2,405,960

COLLIMATING SYSTEM

Filed April 22, 1943

Edwin H. Land
INVENTOR.
BY Donald L. Brown
Attorney

Patented Aug. 20, 1946

2,405,960

UNITED STATES PATENT OFFICE 2,405,960

COLLIMATING SYSTEM

Edwin H. Land, Cambridge, Mass., assignor to Polaroid Corporation, Cambridge, Mass., a corporation of Delaware Application April 22, 1943, Serial No. 484,004

3 Claims. (Cl. 88—1)

This invention relates to optical systems, and more particularly to an optical system or device for collimating a beam of light.

It is a particular object of the present invention to provide new and improved means for collimating a beam of light.

Another object is to provide such means which will be capable of producing substantially perfect collimation of a beam of light, i. e. collimation to a value of the order of one second of arc, in at least one plane.

A further object is to provide such collimating means in the form of a prism and means for illuminating a surface thereof at substantially the grazing angle, with a partially collimated beam of light.

A still further object is to provide such a collimating system suitable for use in monochromatic light or which may be combined with additional prism means for achromatizing the resulting collimated beam.

Figure 1:
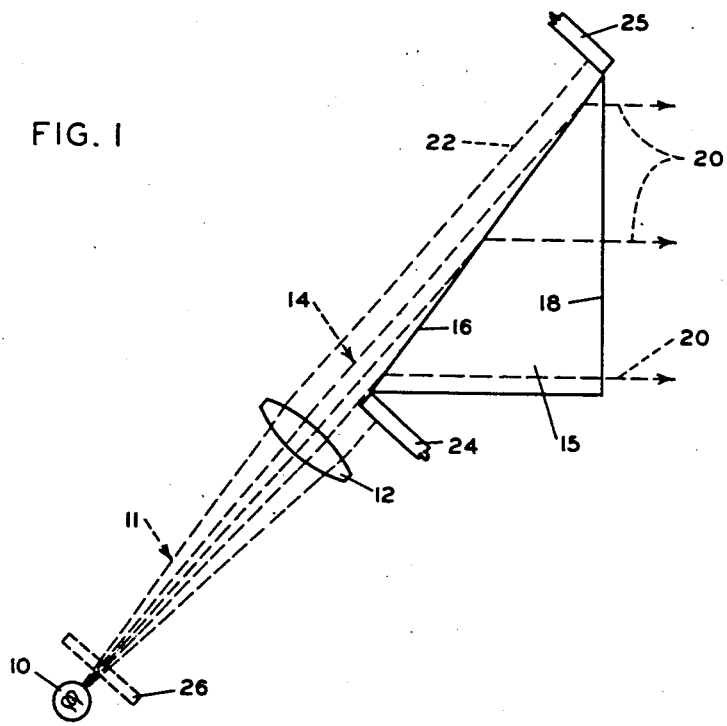
Figure 2:
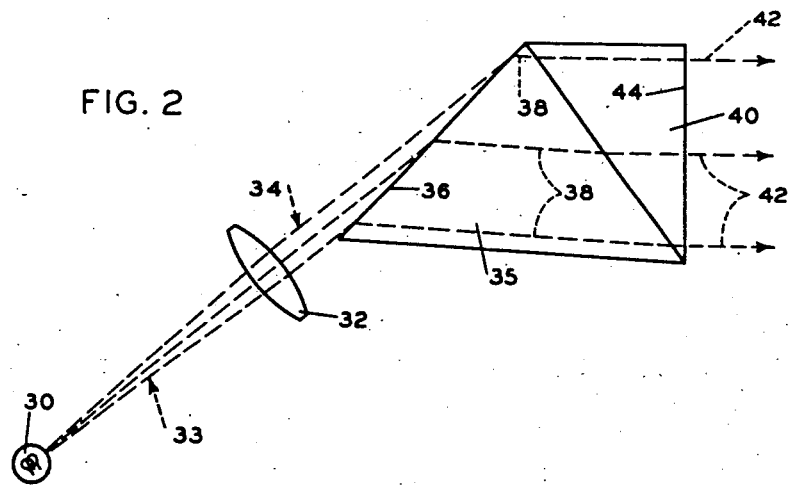

Other objects and advantages will in part be apparent and in part be pointed out in the course of the following description of one or more embodiments of the invention, which are given as non-limiting examples, in connection with the accompanying drawing, in which:

Figure 1 is a side elevation illustrating diagrammatically the operation of an embodiment of the invention; and Fig. 2 is a view similar to Fig. 1 illustrating the operation of another embodiment of the invention including achromatizing means.

Heretofore, the collimation of light beams has been accomplished by means of lenses or parabolic mirrors. It is possible with such means to obtain reasonably accurate collimation, particularly of a beam emanating from a point source, but only with relatively large and expensive mirrors or lenses, and only if the source and the collimating element are carefully adjusted with respect to each other. Furthermore, even with the best lenses and mirrors, the degree of collimation is inclined to vary considerably, and accuracy of the order of from 6 to 10 seconds of arc is normally as high as can be expected. Furthermore, the collimation of a beam emitted by anything other than a point source, for example a line source, will be substantially less perfect, and even with the most expensive lenses and mirrors collimation to a degree more nearly perfect than 5 seconds of arc is virtually unobtainable.

In accordance with the present invention, it has been discovered that virtually perfect collimation of a beam of light can be achieved by illuminating one surface of a prism at substantially the grazing angle of incidence with a partially collimated beam. Fig. 1 illustrates diagrammatically the operation of one form of the collimating system of the invention. Electric lamp 10 emits a beam of light represented by ray lines 11, which is partially collimated by lens 12, as represented by rays 14. Rays 14 are incident upon one surface 16 of prism 15 at substantially the grazing angle and are refracted within prism 15 and emerge from the opposite surface 18 thereof to form a substantially perfectly collimated beam, as illustrated by rays 20. Any suitable means may be provided for positioning the prism to achieve the desired result. Rays 22 represent portions of the beam collimated by lens 12 which are propagated in such direction as to miss surface 16 of prism 15, and in order to prevent their entering the collimating prism or system, there may preferably be provided any suitable baffle means 24, 25 adapted to block or absorb said undesired light.

In the collimating system of the invention, the angle of incidence of rays 14 on prism surface 16 approaches the grazing angle, or 90 degrees, and the angle of refraction within prism 15 for rays 20 is of the order of 41 degrees. At these angles relatively large variations in the angles of incidence of rays 14 will produce very small variations in their angles of refraction within prism 15. It is apparent, therefore, that the refracted rays within the prism will be more truly collimated, under the specified conditions, than the incident rays.

This may be more easily understood from one or more specific examples. Let $a$ and $a'$ represent the angles of incidence on surface 16 of the two most widely diverging of rays 14, and let $b$ and $b'$ represent angles of refraction at the outside of surface 18 of the most widely diverging of rays 20. Then $a$ minus $a'$ will be a measure of the perfection of collimation of rays 14, and $b$ minus $b'$ will be a measure of the perfection of collimation of rays 20. Then, if prism 15 be made of crown glass having an index of refraction of 1.5233 and having surfaces 16 and 18 flat to one second, and if $a$ minus $a'$ equals 15 minutes, $b$ minus $b'$ will equal only 1.5 seconds where surface 18 is normal to the direction of propagation of rays 20. In other words, rays 20 will be 600 times more perfectly collimated than rays 14. To put it still another way, if the rays making the angles $a$ and $a'$ with the surface 16 are considered as coming from different points which lie in the same plane on the light source, then these two points will seem to have moved 600 times closer together. The result is to decrease the apparent angular width of the source or the apparent angular separation between any ray coming from one point and any ray coming from another point in the plane of collimation. By way of further example, if $a$ minus $a'$ equals 30 minutes, $b$ minus $b'$ will equal approximately 9 seconds, namely, a degree of collimation over 200 times more perfect than that produced by lens 12.

It will now be seen that the degree of accuracy of lens 12 is relatively immaterial in the collimating system of the present invention, since a relatively small, imperfect, and hence inexpensive lens for use in combination with a prism as explained above will still give a degree of collimation approaching or superior to that of a large and expensive lens without the prism. It should also be pointed out that the shape and size of prism 15 are relatively immaterial and may be widely varied, depending upon the conditions under which the system is to be used. Most perfect collimation of the emitted rays is secured if they are propagated in a direction perpendicular to the emitting face of the prism in the plane of collimation, but such a condition is not essential. Very satisfactory results have been obtained where the emitted rays made angles of as much as 15 degrees with the prism face in said plane. Furthermore, it should be pointed out that the production of prisms having surfaces flat to the degree mentioned above, namely one second, is relatively easy and inexpensive, particularly in comparison with the cost of production of accurate collimating lenses or parabolic mirrors.

It will, of course, be understood that the collimating action of the above described system of the invention will be effective in only one plane, namely, the plane of the paper in the drawings, and reference to the "plane of collimation" will be understood as meaning this plane. This plane may be further defined by the normal to the entrance surface of the prism illuminated by the partially collimated beam at substantially grazing incidence and the mean path of the rays of said beam which are incident on the entrance surface. However, improved collimation in the opposite plane may then be achieved, if desired, by the use of an additional prism suitably positioned with respect to rays 20 in the same manner as prism 15 is positioned with respect to rays 14. Under most conditions in which the collimating system of the present invention may be used, however, collimation in only one plane will be sufficient. For example, the present invention is particularly useful in stereoscopic range finders and analogous instruments. It has been found in connection with such instruments that the human eyes possess stereoscopic acuity to a degree such that they are capable of detecting variations as small as one second of arc. However, this acuity is possessed only in one plane, namely the plane of the interocular. Therefore, only a single prism 15 need be used in such range finders if it be arranged for collimation in the plane of the interocular or base line of the instrument, since variations from true collimation in the opposite plane is immaterial and may be tolerated even up to two degrees or more. Furthermore, since even the finest lenses and mirrors achieve maximum collimation only with a point light source, and since in range finders of the above type it is preferred to use a line light source or more complex indicia means, the collimating system of the present invention is particularly useful therein by reason of the fact that its accuracy is not limited by the shape or size of the beam.

It should be pointed out that the collimation produced by the above described embodiment of the invention will be according to the wavelength of the incident light. That is to say, each wavelength of light will be substantially perfectly collimated but will vary in its ultimate direction of propagation from each other wavelength, giving a spectrum pattern. This result may be overcome by utilizing monochromatic light, as by inserting a suitable filter 26 in the system or by coupling with prism 15 a suitable achromatizing prism in the manner illustrated in Fig. 2.

In Fig. 2, light source 30 emits a beam of light 33 which is partially collimated by lens 32. Rays 34 collimated by lens 32 illuminate surface 36 of prism 35 at substantially the grazing angle, and are collimated within the prism as indicated by ray lines 38. An additional prism 40 is positioned adjacent to prism 35 and is adapted by reason of its design and index of refraction to achromatize rays 38 transmitted from prism 35, and to redirect them as an achromatic collimated beam represented by rays 42. It will also be understood that there will preferably be provided suitable means for eliminating stray light, as explained above in connection with baffles 25 in Fig. 1.

The choice of the design and material of prism 40 is dependent upon the design and material of prism 35, as will be understood by those skilled in the art. Thus prism 35 may comprise crown glass having a refractive index of 1.5233, and prism 40 may comprise dense flint glass having a refractive index of 1.617. It will be understood, however, that the invention is not limited to the use of any particular materials or angles. It is preferred, as pointed out in connection with Fig. 1, that rays 42 are propagated in a direction as nearly perpendicular as possible to emergent face 44 of prism 40, and this factor should also be considered in designing the two prisms.

Where a collimating lens is employed with the collimating prism of the invention, best results are obtained if the elements are so positioned that the prism acts upon light traversing substantially the center of the lens, i. e. the most efficient collimating portion of the lens. Whether or not a lens is used, and in many instances it may be unnecessary, as for example a line or slit light source is used, the collimating prism functions most efficiently if it is so designed that the collimated beam emitted therefrom leaves the prism in a direction substantially normal to the emitting face of the prism, at least in the plane of collimation of the beam. Satisfactory results have, however, been obtained where the collimated beam is emitted from the prism at angles to the normal as great as 15 degrees, or even greater under certain circumstances, as for example where the beam incident on the prism is itself well collimated.

As has already been pointed out, the collimating system of the present invention is subject to the wide degrees of variation, depending upon the results desired and the purpose for which it is to be used. The collimating prism may take any form adapted to fit within the installation for which it is intended, and the achromatizing element or elements will necessarily vary similarly, depending upon the collimating prism used.

Other modifications of the above described embodiments of the invention will be readily apparent to those skilled in the art, and are to be understood as coming within the scope hereof.

It is also to be understood that the following claims are intended to cover all the generic and specific features of the invention herein described, and all statements of the scope of the invention which, as a matter of language, might be said to fall therebetween.

What is claimed is:

1. In an optical system, a light source, and means for partially collimating light aligned therewith and receiving light therefrom and transmitting said light in partially collimated condition along a predetermined path in a predetermined direction, in combination, prism means through which said partially collimated light is transmitted in a predetermined path internally of the prism means while undergoing refraction for improving the collimation and decreasing the apparent angle of separation between the rays thereof which emanate from different points lying in the plane of collimation, said prism means having a portion which defines an entrance face joined to a portion which defines an exit face at a predetermined angular relation, said prism means positioned to have its entrance face at least partially extending across said path followed by the partially collimated light proceeding from said collimator means, and the normal to said entrance face forming an angle with the path of said partially collimated light which is slightly less than 90° to have rays of said partially collimated light intercepted by said entrance face and enter the prism means, the exit face being inclined to the light path followed by rays within the prism means to have the rays of improved collimation and decreased angular separation emerge therefrom in a path and in a direction ranging from substantially parallel to the normal to said exit face to an angle of less than 15° to the normal of said exit face measured in the plane of collimation.

2. In an optical system, a light source, and means for partially collimating light aligned therewith and receiving light therefrom and transmitting said light in partially collimated condition along a predetermined path and in a predetermined direction, in combination, prism means through which said partially collimated light is transmitted in a predetermined path internally of the prism means while undergoing refraction for improving the collimation and decreasing the apparent angle of separation between the rays thereof which emanate from different points lying in the plane of collimation, said prism means having a portion which defines an entrance face joined to a portion which defines an exit face at a predetermined angular relation, said prism means positioned to have its entrance face at least partially extending across said path followed by the partially collimated light proceeding from said collimator means, and the normal to said entrance face forming an angle with the path of said partially collimated light which is slightly less than 90° to have rays of said partially collimated light intercepted by said entrance face and enter the prism means, the exit face being inclined to the light path followed by rays within the prism means to have the rays of improved collimation and decreased angular separation emerge therefrom in a path and in a direction substantially parallel to the normal to said exit face measured in the plane of collimation.

3. In an optical system, a light source, and means for partially collimating light aligned therewith and receiving light therefrom and transmitting said light in a partially collimated condition along a predetermined path in a predetermined direction, in combination, prism means through which said partially collimated light is transmitted in a predetermined path internally of the prism means while undergoing refraction for improving the collimation and decreasing the apparent angle of separation between the rays thereof which emanate from different points lying in the plane of collimation, said prism means having a portion which defines an entrance face joined to a portion which defines an exit face at a predetermined angular relation, said prism means positioned to have its entrance face at least partially extending across said path followed by the partially collimated light proceeding from said collimator means, and the normal to said entrance face forming an angle with the path of said partially collimated light which is slightly less than 90° to have rays of said partially collimated light intercepted by said entrance face and enter the prism means, the exit face being inclined to the light path followed by rays within the prism means to have the rays of improved collimation and decreased angular separation emerge therefrom along a path predeterminedly inclined to the normal to the exit face of said prism means in the plane of collimation at an angle whereby collimation of the light affected by refraction at the entrance face of the prism means remains substantially unchanged, and second prism means through which light emerging from the exit face of said first prism means is transmitted in a predetermined path internally thereof while undergoing refraction for at least decreasing the apparent angle of separation between the rays thereof of different wavelength whereby to achromatize the light transmitted therethrough, said second prism means having a portion which defines an entrance face joined to a portion which defines an exit face in a predetermined angular relation, said second prism means positioned to have its entrance face extending across the path followed by the light emerging from the exit face of said first prism means and at a predetermined angle thereto whereby rays emerging from the first prism means and intercepted by the entrance face of said second prism means enter the second prism means, the exit face of said second prism means being inclined to the light path followed by rays within said second prism means to have such rays emerge therefrom in a path and in a direction ranging from substantially parallel to the normal to said exit face to an angle of less than 15° to the normal of said exit face measured in the plane of collimation, said first prism means being formed of an optical crown material and said second prism means being formed of an optical flint material.

EDWIN H. LAND.